(12) United States Patent
Ishikawa (10) Patent No.: US 10,168,655 B2
(45) Date of Patent: Jan. 1, 2019

(54) IMAGE FORMING APPARATUS INCLUDING ELECTRIC STORAGE PORTION

(71) Applicant: CANON KABUSHIKI KAISHA, Tokyo (JP)

(72) Inventor: Junji Ishikawa, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/672,073

(22) Filed: Aug. 8, 2017

(65) Prior Publication Data

US 2018/0067445 A1 Mar. 8, 2018

(30) Foreign Application Priority Data

Sep. 6, 2016 (JP) .................................. 2016-173634

(51) Int. Cl.
G03G 15/00 (2006.01)
G03G 15/20 (2006.01)
H02J 7/00 (2006.01)
H02J 7/02 (2016.01)
H02J 7/34 (2006.01)

(52) U.S. Cl.
CPC .......... G03G 15/80 (2013.01); G03G 15/2017 (2013.01); H02J 7/0068 (2013.01); H02J 7/02 (2013.01); H02J 7/345 (2013.01)

(58) Field of Classification Search
CPC ... G03G 15/80; G03G 15/2039; G03G 15/205
USPC ........................................ 399/67, 69, 70, 88
See application file for complete search history.

(56) References Cited

U.S. PATENT DOCUMENTS 7,639,963 B2 * 12/2009 Matsuo ................. G03G 15/80
399/88
7,683,297 B2 3/2010 Kishi et al. ................... 219/619
8,494,383 B2 * 7/2013 Shimura et al. ... G03G 15/2039
399/67

* cited by examiner

*Primary Examiner* — William J Royer
(74) *Attorney, Agent, or Firm* — Venable LLP (57) ABSTRACT

An image forming apparatus including: an image forming portion; a fixing portion; an electric storage portion configured to supply electric power to a load; a first power supply configured to supply electric power to the load; a second power supply configured to supply electric power to the fixing portion; and a controller configured to supply electric power from the electric storage portion to the load and supply a predetermined maximum allowable power from an AC power supply to the second power supply when an image formation request is input, wherein in a case where a remaining amount of the electric storage portion becomes lower than a predetermined value, the controller reduces electric power supplied from the second power supply to the fixing portion lower than the maximum allowable power, and thereafter switches an electric power supply to the load from the electric storage portion to the first power supply.

14 Claims, 9 Drawing Sheets

IMAGE FORMING APPARATUS INCLUDING ELECTRIC STORAGE PORTION

BACKGROUND OF THE INVENTION

Field of the Invention

The present invention relates to an image forming apparatus including an electric storage portion and configured to form an image on a recording medium.

Description of the Related Art

A demand for lower power consumption has been increased, and various electrical apparatus are accordingly required to operate with reduced electric power consumption to increase their energy efficiency. For example, image forming apparatus are in a standby state most of the time, and hence when standing by, the image forming apparatus stop supplying electric power to devices that do not need to be supplied with electric power, thereby reducing electric power consumption in the standby state. In the standby state, it is thus effective to stop heating of a heater of a fixing device, which consumes electric power most in an image forming apparatus. However, it takes time to increase the temperature of the fixing device that has been decreased once to a suitable temperature at which the image forming apparatus, which has returned from the standby state, forms images again. The fixing device whose temperature has been decreased may be heated rapidly with increased heating electric power, but the heating electric power cannot take a value exceeding a maximum allowable power (for example, 1,500 W) that can be supplied from a commercial power supply to the image forming apparatus.

As a method of increasing electric power supplied to a fixing device while keeping the electric power equal to or lower than a maximum allowable power that can be supplied from a commercial power supply to an image forming apparatus, there may be given a method in which a rechargeable electric storage device is used as an auxiliary power supply (see U.S. Pat. No. 7,683,297). The proposed method is as follows. For example, when the image forming apparatus activates or returns from a standby state, or immediately after the start of recording medium feeding, the maximum allowable power of the commercial power supply, which can be supplied to the image forming apparatus, is used for heating the fixing device, and necessary electric power is supplied to loads except for the fixing device from the electric storage device being the auxiliary power supply. Then, when electric power necessary for maintaining the temperature of the fixing device is reduced, the supply source that supplies electric power to the loads except for the fixing device is switched to an AC/DC power supply being a main power supply device.

Due to the configuration in which the loads except for the fixing device are supplied with the electric power from the electric storage device, the electric power supply source needs to be switched to the main power supply device when the remaining amount of voltage charged to the electric storage device falls below a predetermined voltage, while the electric power supplied from the commercial power supply to the fixing device is kept equal to or lower than the maximum allowable power. How the charged voltage remaining amount of the electric storage device is reduced differs depending on the individual difference and duration of use of the image forming apparatus, for example, and cannot be controlled by the operation modes or sequences of the image forming apparatus. Thus, there may be a case in which the supply source that supplies electric power to the loads except for the fixing device needs to be switched from the electric storage device to the main power supply device due to a reduction in charged voltage of the electric storage device, under a state in which the maximum electric power is supplied from the commercial power supply to the fixing device. In switching, if the electric storage device is switched to the main power supply device by inaccurate control, the electric power supplied to the image forming apparatus may exceed the maximum allowable power, which can be supplied from the commercial power supply. This has been a problem.

SUMMARY OF THE INVENTION

The present invention has been made under such circumstances, and has an object to switch an electric power supply to a load from an electric storage device to a main power supply device without exceeding a maximum allowable power.

In order to solve the above-mentioned problem, according to one embodiment of the present invention, there is provided an image forming apparatus comprising:

an image forming portion configured to form an image on a recording medium;

a fixing portion configured to heat the recording medium to fix the image onto the recording medium;

an electric storage portion configured to supply an electric power to a load configured to operate for image formation by the image forming portion;

a first power supply configured to supply an electric power supplied from an AC power supply to the load and the electric storage portion;

a second power supply configured to supply an electric power supplied from the AC power supply to the fixing portion; and a controller configured to supply the electric power from the electric storage portion to the load and supply a predetermined maximum allowable power from the AC power supply to the second power supply when an image formation request for requesting image formation on the recording medium is input to the controller, wherein in a case where an electric storage remaining amount of the electric storage portion becomes lower than a predetermined value, the controller reduces the electric power supplied from the second power supply to the fixing portion lower than the maximum allowable power before the electric storage remaining amount of the electric storage portion becomes lower than the predetermined value, and thereafter switches an electric power supply to the load from the electric storage portion to the first power supply.

Further features of the present invention will become apparent from the following description of exemplary embodiments with reference to the attached drawings.

DESCRIPTION OF THE EMBODIMENTS

Now, embodiments of the present invention will be described with reference to the drawings.

First Embodiment

<Configuration of Image Forming Apparatus>

Figure 1:
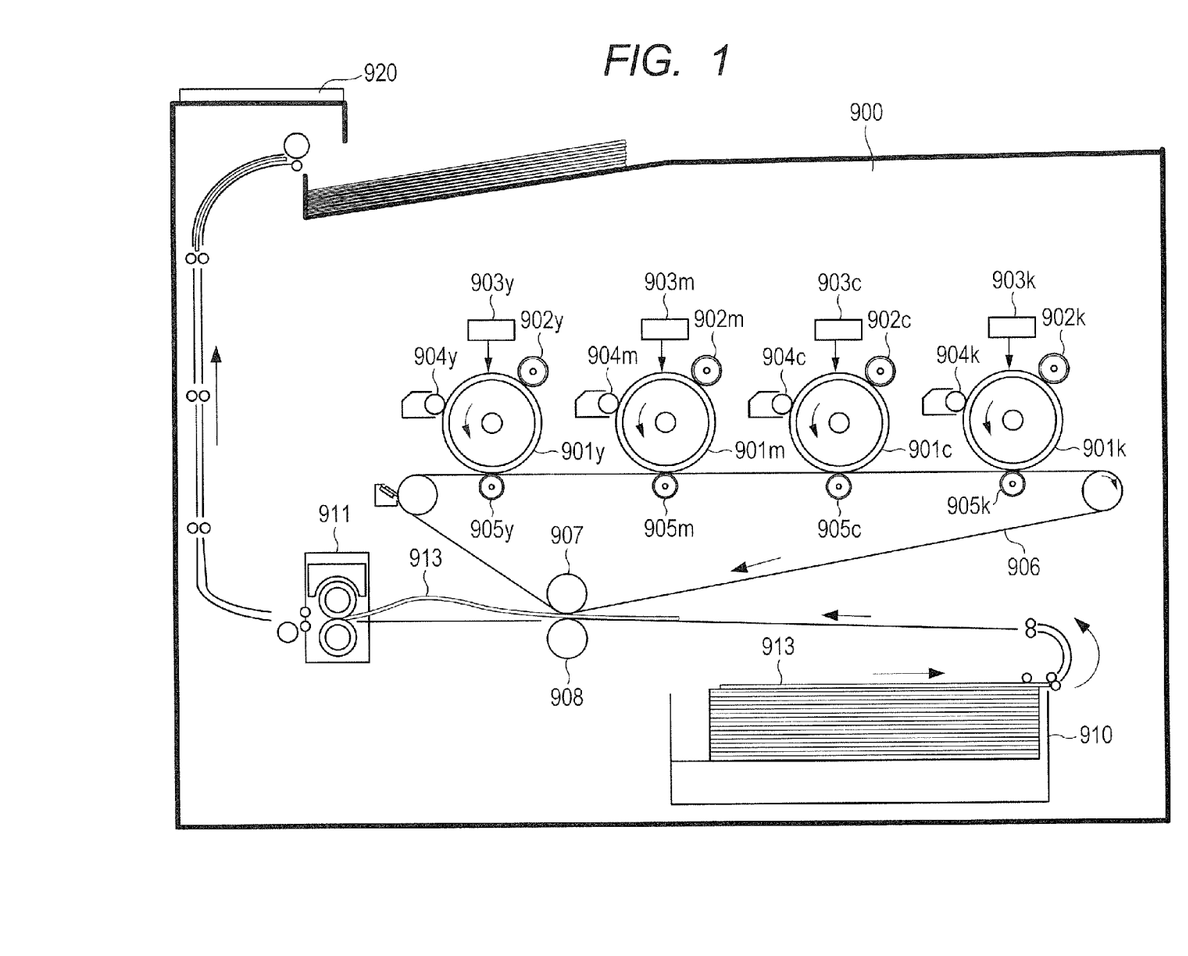
FIG. 1 is a sectional view for illustrating the configuration of an image forming apparatus according to first and second embodiments of the present invention.

FIG. 1 is a schematic view of the configuration of a color laser printer 900 (hereinafter referred to as "printer 900"), which is an example of an image forming apparatus according to a first embodiment. The image forming apparatus may be, for example, an electrophotographic copying machine (for example, digital copying machine), a color LED printer, a facsimile apparatus, or a multifunction peripheral (MFP). The image forming apparatus is not limited to a color image forming apparatus configured to form color images on recording media, but may be a monochrome image forming apparatus configured to form monochrome images on recording media. The printer 900 is a tandem printer, and includes four image forming portions corresponding to the respective colors of toners, namely, yellow (y), magenta (m), cyan (c), and black (k). The image forming portions have the same configuration. Suffixes y, m, c, and k added to reference symbols illustrated in FIG. 1 represent the yellow image forming portion, the magenta image forming portion, the cyan image forming portion, and the black image forming portion, respectively. In the following description, the suffixes y, m, c, and k are omitted except for a case in which an image forming portion with a toner of a particular color is referred to. Each image forming portion includes a photosensitive drum 901 being a photosensitive member, a charging roller 902, a laser unit 903, and a developing sleeve 904.

In FIG. 1, the photosensitive drum 901 rotates in a direction of the arrow (counterclockwise direction), and the charging roller 902 charges the surface of the photosensitive drum 901 to a uniform potential. The laser unit 903 exposes the photosensitive drum 901 that has been charged to the uniform potential to light through irradiation with laser light corresponding to image data, thereby forming an electrostatic latent image on the surface of the photosensitive drum 901. When a part of the photosensitive drum 901 on which the electrostatic latent image is formed passes the developing sleeve 904, toner is adhered to the electrostatic latent image on the photosensitive drum 901, and a toner image is thus formed. The toner image formed on the photosensitive drum 901 is transferred onto an intermediate transfer belt 906 with voltage applied to a primary transfer roller 905. The image forming operation described above is executed in each image forming portion, and toner images of yellow (y), magenta (m), cyan (c), and black (k) are transferred onto the intermediate transfer belt 906 in a superimposed manner. In this way, a full color image is formed.

Then, the intermediate transfer belt 906 having the full color image formed thereon moves toward a secondary transfer portion including an inner secondary transfer roller 907 and an outer secondary transfer roller 908 in a direction of the arrow (clockwise direction) in FIG. 1. A recording medium (hereinafter referred to as "sheet") 913, for example, paper fed from a feed cassette 910 is conveyed to reach the secondary transfer portion at timing at which the toner image formed on the intermediate transfer belt 906 passes through the secondary transfer portion. The toner image on the intermediate transfer belt 906 is transferred onto the sheet 913. The sheet 913 having the toner image transferred thereon is conveyed to a fixing device 911 being a fixing portion including a heater 912 (see FIG. 2) for heating the sheet 913, and the toner image on the sheet 913 is fixed onto the sheet 913 through heating and pressurizing. The sheet 913 having the toner image fixed thereon is conveyed along a conveyance path to be discharged. The printer 900 stops supplying electric power to the fixing device 911 in a standby state excluding the image forming operation of forming images based on print jobs that are input from an operation portion 920 configured to input data and display information or an external computer (not shown).

<Control Block of Power Supply Control Portion>

Figure 2:
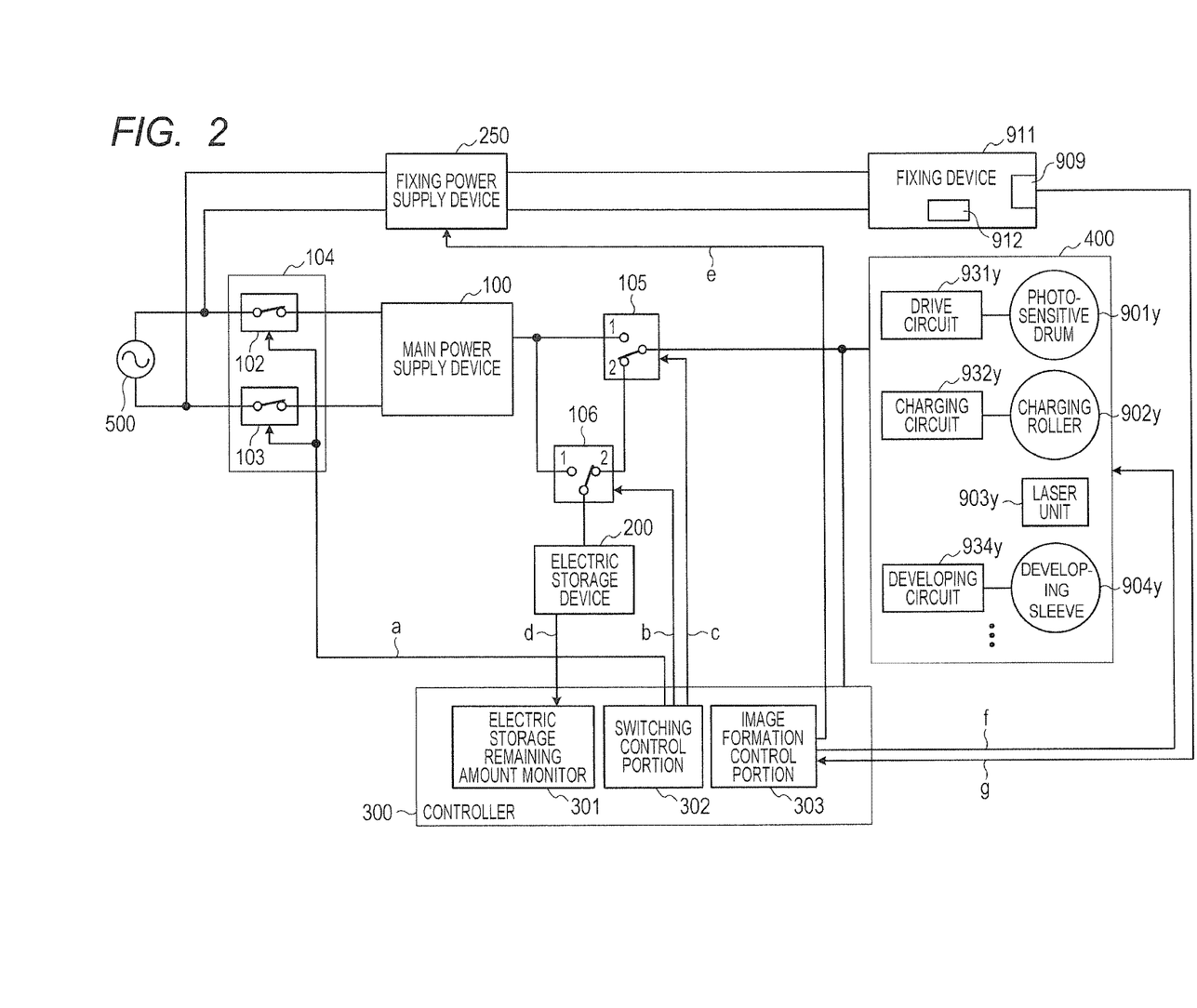
FIG. 2 is a control block diagram of a power supply system of the first embodiment.

FIG. 2 is a control block diagram of a power supply device of the printer 900 of FIG. 1, which is the image forming apparatus. As illustrated in FIG. 2, the printer 900 includes a main power supply device 100 being a first power supply configured to supply electric power to loads except for the fixing device 911, and a fixing power supply device 250 being a second power supply configured to supply electric power to the fixing device 911. The main power supply device 100 is supplied with an AC voltage (100 V) from a commercial power supply 500 being an AC power supply via a first switch circuit 104. The first switch circuit 104 includes a relay 102 and a relay 103 provided to two electric power lines of the commercial power supply 500. The main power supply device 100 being an AC/DC converter is configured to convert input AC voltage into DC voltage and output the DC voltage. The fixing power supply device 250 is configured to receive AC voltage from the commercial power supply 500 and supply electric power for heating the heater 912 of the fixing device 911 by being controlled by an image formation control portion 303 of a controller 300.

The main power supply device 100 is configured to supply electric power to a load 400 of each image forming portion and the controller 300, and is further configured to supply electric power to charge an electric storage device (capacitor) 200 being an auxiliary power supply. The load 400 includes components of each image forming portion, that is, a drive circuit 931 configured to rotate the photosensitive drum 901, a charging circuit 932 configured to apply high voltage to the charging roller 902, the laser unit 903, and a developing circuit 934 configured to apply high voltage to the developing sleeve 904, for example. The load 400 illustrated in FIG. 2 is the load of the image forming portion of yellow (y), but the electric power is supplied to the loads 400 of other image forming portions of magenta (m), cyan (c), and black (k).

The electric storage device 200 being an electric storage portion is charged by being supplied with the electric power from the main power supply device 100, and is discharged to supply the electric power to the load 400 and the controller 300. The electric storage device 200 includes, a secondary battery or a capacitor, for example. To the electric storage device 200, one end of a third switch circuit 106 is connected. The electric storage device 200 is charged with DC voltage output from the main power supply device 100 when the other end of the third switch circuit 106 is connected to a contact 1. Meanwhile, the electric storage device 200 supplies (discharges) the electric power to the load 400 and the controller 300 when the other end of the third switch circuit 106 is connected to a contact 2.

A second switch circuit 105 is a switch configured to switch a supply source that supplies electric power to the load 400 and the controller 300. When the second switch circuit 105 is connected to a contact 1, the electric power is supplied from the main power supply device 100 to the load 400 and the controller 300. When the second switch circuit 105 is connected to a contact 2, on the other hand, the electric power is supplied from the electric storage device 200 to the load 400 and the controller 300.

The controller 300 includes an electric storage remaining amount monitor 301 (hereinafter also referred to as "monitor 301"), a switching control portion 302, and the image formation control portion 303. The monitor 301 is configured to monitor the voltage remaining amount (also referred to as "electric storage device remaining amount") of the electric storage device 200 based on a signal "d" indicating information on the charged voltage remaining amount of the electric storage device 200. The switching control portion 302 is configured to control switching of each of the first switch circuit 104, the second switch circuit 105, and the third switch circuit 106 depending on the voltage remaining amount of the electric storage device 200. The switching control portion 302 is configured to perform the following control when the electric power is supplied from the main power supply device 100 to the load 400 and the controller 300. Specifically, the switching control portion 302 switches the relays 102 and 103 of the first switch circuit 104 to ON (connection) based on a signal "a", connects the second switch circuit 105 to the contact 1 based on a signal "c", and connects the third switch circuit 106 to the contact 1 based on a signal "b". Through this operation, the main power supply device 100 starts operating to supply the electric power to the load 400 and the controller 300.

On the other hand, the switching control portion 302 is configured to perform the following control when the electric power is supplied from the electric storage device 200 to the load 400 and the controller 300. Specifically, the switching control portion 302 switches the relays 102 and 103 of the first switch circuit 104 to OFF (disconnection) based on the signal "a", connects the second switch circuit 105 to the contact 2 based on the signal "c", and connects the third switch circuit 106 to the contact 2 based on the signal "b". Through this operation, the main power supply device 100 stops operating, and the electric storage device 200 supplies the electric power to the load 400 and the controller 300.

The image formation control portion 303 is configured to transmit an image formation control signal "f" to the load 400, which forms the image forming portion of each color, thereby controlling the image forming operation. The image formation control portion 303 is further configured to adjust a heater temperature of the fixing device 911 based on a temperature detection signal "g" from a temperature detector 909 configured to detect a temperature of the heater 912 provided in the fixing device 911. Thus, the image formation control portion 303 is configured to control electric energy supplied from the fixing power supply device 250 to the fixing device 911, based on a signal "e" that is transmitted to the fixing power supply device 250, thereby controlling the electric power supplied from the commercial power supply 500 to the fixing power supply device 250.

<Power Supply Control Sequence in Warming Up>

Figure 3:
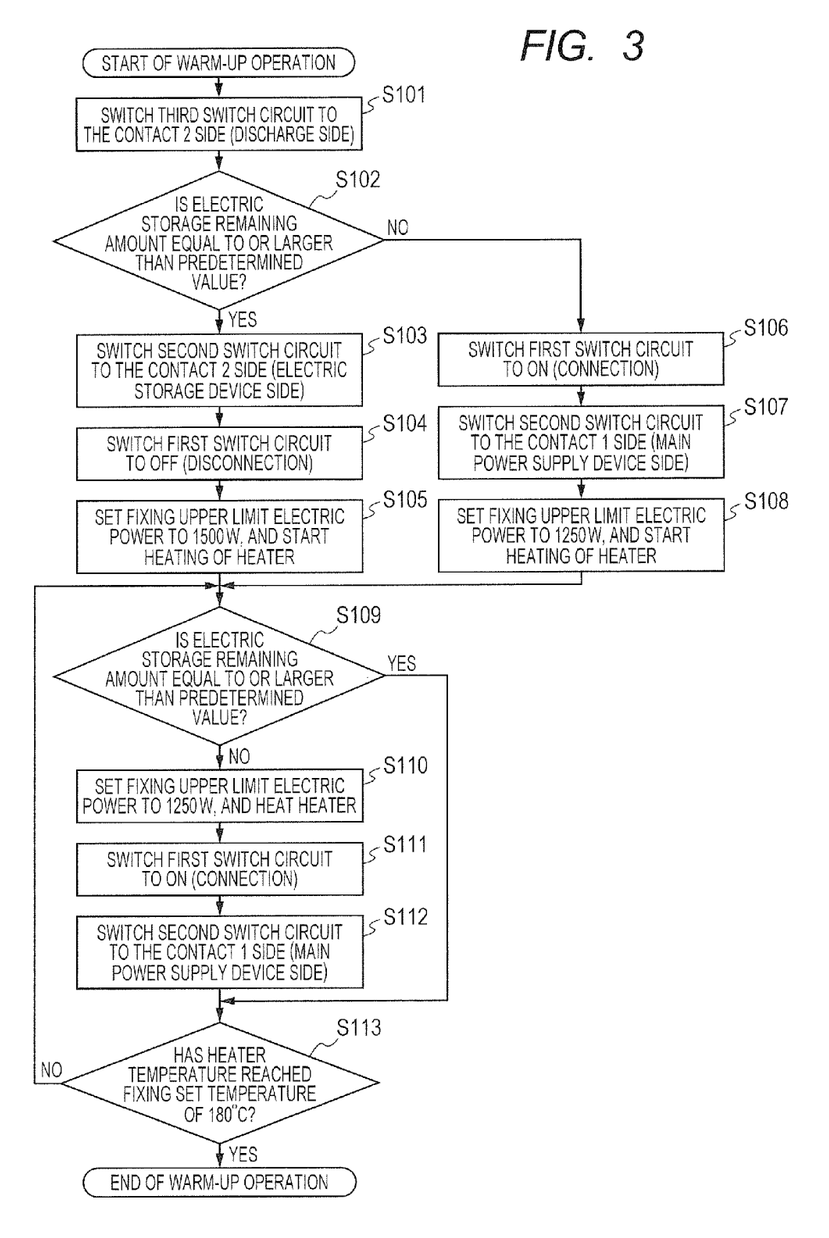
FIG. 3 is a flowchart for illustrating a control sequence of the image forming apparatus of the first embodiment.
Figure 4:
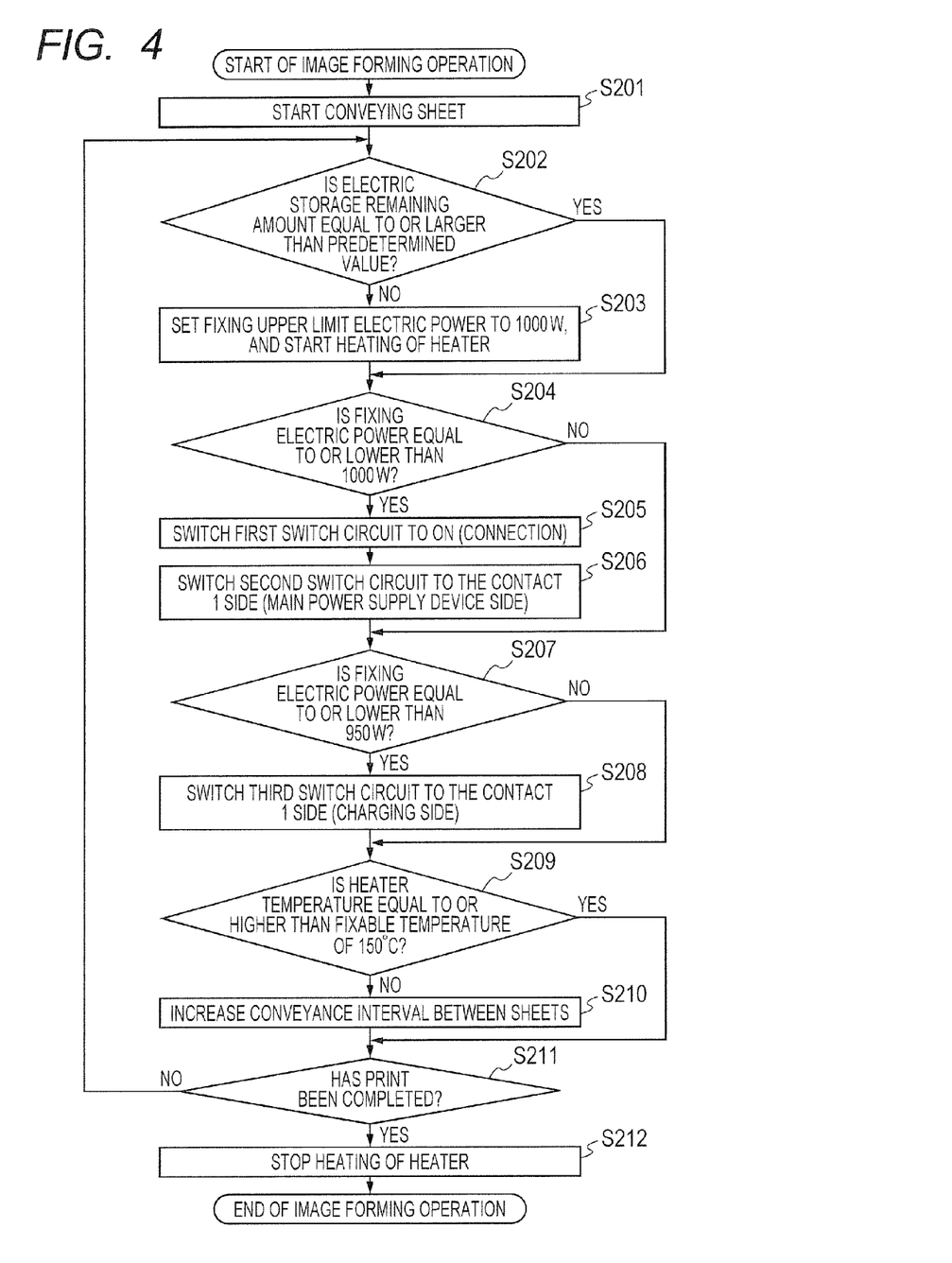
FIG. 4 is a flowchart for illustrating a control sequence of the image forming apparatus of the first embodiment.

FIG. 3 and FIG. 4 are flowcharts for illustrating control sequences related to electric power control for forming images through heating of the heater 912 of the fixing device 911 in the printer 900 of the first embodiment in the standby state. The controller 300 is configured to execute the flowcharts. Here, a maximum allowable power that can be supplied from the commercial power supply 500 to the printer 900 is determined in advance based on rated electric power, and is set to 1,500 W here, which is the rated electric power. Further, when the printer 900 is in the standby state, no electric power is supplied to the heater 912 of the fixing device 911. The printer 900 is configured to start warm-up operation for the fixing device 911 when receiving a print job being an image formation request, and then transition to the image forming operation when the heater 912 of the fixing device 911 reaches a predetermined temperature and the warm-up operation is thus completed.

First, the warm-up operation of the printer 900 will be described with reference to the flowchart of FIG. 3. In Step (hereinafter abbreviated as "S") 101, the warm-up operation is started, and the controller 300 switches the third switch circuit 106 to the contact 2 side (discharge side) based on the signal "b" from the switching control portion 302, and makes setting so that electric power is supplied from the electric storage device 200 to the load 400 and the controller 300. In S102, the controller 300 determines whether or not the voltage remaining amount (electric storage remaining amount) of the electric storage device 200 is equal to or larger than a predetermined value based on a result from the monitor 301 monitoring the signal "d" from the electric storage device 200, which indicates the information on the charged voltage remaining amount. When the controller 300 determines that the electric storage remaining amount of the electric storage device 200 is equal to or larger than the predetermined value as a result of the monitoring by the monitor 301, the controller 300 proceeds to processing in S103. On the other hand, the controller 300 proceeds to processing in S106 when determining that the electric storage remaining amount of the electric storage device 200 is smaller than the predetermined value.

In S103, the controller 300 switches the second switch circuit 105 to the contact 2 side (electric storage device side) based on the signal "c" from the switching control portion 302 so that the electric power is supplied to the load 400 and the controller 300 from the electric storage device 200. In S104, the controller 300 switches the first switch circuit 104 to OFF (disconnection) based on the signal "a" from the switching control portion 302 so that electric power supplied from the commercial power supply 500 is supplied only to the fixing device 911. Through this operation, the main power supply device 100 stops operating, and the electric power is supplied to the load 400 and the controller 300 from the electric storage device 200. In S105, the controller 300 sets, by the image formation control portion 303, the upper limit value of electric energy (hereinafter referred to as "fixing upper limit electric power"), which can be supplied from the commercial power supply 500 to the fixing power supply device 250, to 1,500 W (watt) being the maximum allowable power. Then, the controller 300 controls the electric energy supplied from the fixing power supply device 250 to the fixing device 911, based on the signal "e" from the image formation control portion 303. Through this operation, the fixing power supply device 250 starts heating of the heater 912 of the fixing device 911 with the fixing upper limit electric power set to 1,500 W.

In S106, the controller 300 switches the first switch circuit 104 to ON (connection) based on the signal "a" from the switching control portion 302 so that electric power is supplied to the load 400 and the controller 300 from the main power supply device 100. Through this operation, AC voltage is input from the commercial power supply 500 to the main power supply device 100. In S107, the controller 300 switches the second switch circuit 105 to the contact 1 side (main power supply device side) based on the signal "c" from the switching control portion 302 so that the electric power is supplied to the load 400 and the controller 300 from the main power supply device 100. Through this operation, the main power supply device 100 starts operating, and the electric power is supplied to the load 400 and the controller 300 from the main power supply device 100. In S108, the controller 300 sets, by the image formation control portion 303, the fixing upper limit electric power to 1,250 W so that electric energy supplied from the commercial power supply 500 to the entire printer 900 does not exceed the maximum allowable power (1,500 W). Then, the controller 300 controls the electric power supplied from the fixing power supply device 250 to the fixing device 911, based on the signal "e" from the image formation control portion 303. Here, in order that the main power supply device 100 may supply the necessary maximum electric power to the load 400 and the controller 300 during the warm-up operation, an electric power of 250 W (first electric power) needs to be supplied from the commercial power supply 500 to the main power supply device 100. Thus, the fixing upper limit electric power is lowered to 1,250 W so that the total of electric power supplied from the commercial power supply 500 to the main power supply device 100 and the fixing power supply device 250 does not exceed 1,500 W. As a result, the fixing power supply device 250 starts heating of the heater 912 of the fixing device 911 with the fixing upper limit electric power set to 1,250 W.

In S109, the controller 300 determines whether or not the voltage remaining amount (electric storage remaining amount) of the electric storage device 200 is equal to or larger than the predetermined value based on a result from the monitor 301 monitoring the signal "d" from the electric storage device 200, which indicates the voltage remaining amount information. When the controller 300 determines that the electric storage remaining amount of the electric storage device 200 is equal to or larger than the predetermined value as a result of the monitoring by the monitor 301, the controller 300 proceeds to processing in S113. On the other hand, the controller 300 proceeds to processing in S110 when determining that the electric storage remaining amount of the electric storage device 200 is smaller than the predetermined value. In S110, the controller 300 sets, by the image formation control portion 303, the fixing upper limit electric power to 1,250 W so that the electric energy supplied from the commercial power supply 500 to the printer 900 does not exceed the maximum allowable power (1,500 W). Then, the controller 300 controls the electric energy supplied from the fixing power supply device 250 to the fixing device 911, based on the signal "e" from the image formation control portion 303. In S111, the controller 300 switches the first switch circuit 104 to ON (connection) based on the signal "a" from the switching control portion 302 so that the electric power is supplied to the load 400 and the controller 300 from the main power supply device 100. Through this operation, the AC voltage is input from the commercial power supply 500 to the main power supply device 100. In S112, the controller 300 switches the second switch circuit 105 to the contact 1 side (main power supply device side) based on the signal "c" from the switching control portion 302 so that the electric power is supplied to the load 400 and the controller 300 from the main power supply device 100. Through this operation, the main power supply device 100 starts operating, and the electric power is supplied to the load 400 and the controller 300 from the main power supply device 100.

In S113, the controller 300 determines whether or not the heater temperature reaches a fixing set temperature of 180° C. with the electric power supplied from the fixing power supply device 250, based on a result from the image formation control portion 303 detecting the temperature detection signal "g" indicating the heater temperature of the fixing device 911. The controller 300 ends the warm-up operation when determining that the heater temperature reaches 180° C. as a result of the detection by the image formation control portion 303. On the other hand, the controller 300 returns to the processing in S109 when determining that the heater temperature does not reach 180° C.

<Power Supply Control Sequence in Image Forming Operation>

Next, the image forming operation, which is performed after the warm-up operation is ended, will be described with reference to the flowchart of FIG. 4. In S201, the controller 300 starts the image forming operation in accordance with the image formation control signal "f" from the image formation control portion 303, and starts conveying the sheet 913 from the feed cassette 910. In S202, the controller 300 determines whether or not the voltage remaining amount (electric storage remaining amount) of the electric storage device 200 is equal to or larger than the predetermined value based on a result from the monitor 301 monitoring the signal "d" from the electric storage device 200, which indicates the voltage remaining amount information. When the controller 300 determines that the electric storage remaining amount of the electric storage device 200 is equal to or larger than the predetermined value as a result of the monitoring by the monitor 301, the controller 300 proceeds to processing in S204 while keeping the setting of electric power supply in the warm-up operation. On the other hand, the controller 300 proceeds to processing in S203 when determining that the electric storage remaining amount of the electric storage device 200 is smaller than the predetermined value. In S203, the controller 300 sets, by the image formation control portion 303, the fixing upper limit electric power to 1,000 W so that the electric energy supplied from the commercial power supply 500 to the printer 900 does not exceed the maximum allowable power (1,500 W). Then, the controller 300 controls the electric energy supplied from the fixing power supply device 250 to the fixing device 911, based on the signal "e" from the image formation control portion 303. Here, in order that the main power supply device 100 may supply the electric power to the load 400 and the controller 300 during the image forming operation, an electric power of 500 W (second electric power) needs to be supplied from the commercial power supply 500 to the main power supply device 100. Thus, the fixing upper limit electric power is lowered to 1,000 W so that the total electric power does not exceed the maximum allowable power of 1,500 W. As a result, the fixing upper limit electric power is lowered to 1,000 W, and the fixing power supply device 250 lowers the electric energy used for heating the heater 912 of the fixing device 911.

In S204, the controller 300 determines whether or not the fixing electric power supplied from the commercial power supply 500 to the fixing power supply device 250 is equal to or lower than 1,000 W, through the processing in S203 or the determination that the fixing device 911 can be maintained at the fixing set temperature of 180° C. That is, the controller 300 determines whether or not the image formation control portion 303 sets the fixing electric power supplied to the fixing power supply device 250 to a value that is equal to or lower than 1,000 W. When the controller 300 determines that the fixing electric power set by the image formation control portion 303 is equal to or lower than 1,000 W, the controller 300 proceeds to processing in S205. On the other hand, the controller 300 proceeds to processing in S207 when determining that the set fixing electric power is larger than 1,000 W. In S205, the controller 300 switches the first switch circuit 104 to ON (connection) based on the signal "a" from the switching control portion 302 so that the electric power is supplied to the load 400 and the controller 300 from the main power supply device 100. Through this operation, the AC voltage is input from the commercial power supply 500 to the main power supply device 100. In S206, the controller 300 switches the second switch circuit 105 to the contact 1 side (main power supply device side) based on the signal "c" from the switching control portion 302 so that the electric power supply to the load 400 and the controller 300 is switched from the electric storage device 200 to the main power supply device 100. Through this operation, the main power supply device 100 starts operating, and the electric power is supplied to the load 400 and the controller 300 from the main power supply device 100.

In S207, the controller 300 determines, by the image formation control portion 303, whether or not the heater 912 of the fixing device 911 can sufficiently maintain the fixing set temperature of 180° C., and the fixing electric power supplied from the commercial power supply 500 to the fixing power supply device 250 is equal to or lower than 950 W. The determination is made with 950 W, which is lower than 1,000 W by 50 W, because an electric power of 50 W (third electric power) needs to be supplied from the commercial power supply 500 to the main power supply device 100 in order to charge the electric storage device 200. When the controller 300 determines, by the image formation control portion 303, that the fixing electric power supplied from the commercial power supply 500 to the fixing power supply device 250 is equal to or lower than 950 W, the controller 300 proceeds to processing in S208. On the other hand, when the controller 300 determines, by the image formation control portion 303, that the fixing electric power is larger than 950 W, the controller 300 proceeds to processing in S209 and does not charge the electric storage device 200. In S208, the controller 300 connects the third switch circuit 106 to the contact 1 (charging side) based on the signal "b" from the switching control portion 302 so that the electric storage device 200 is charged. Through this operation, the DC voltage output from the main power supply device 100 is input to the electric storage device 200, and charging of the electric storage device 200 is thus started.

In S209, the controller 300 determines whether or not the heater temperature is maintained at a value that is equal to higher than a fixable temperature of 150° C. with the electric power supplied from the fixing power supply device 250, based on a result from the image formation control portion 303 detecting the temperature detection signal "g" indicating the heater temperature of the fixing device 911. The controller 300 proceeds to processing in S211 when determining that the heater temperature is equal to or higher than 150° C. as a result of the detection by the image formation control portion 303. On the other hand, the controller 300 proceeds to processing in S210 when determining that the heater temperature is lower than 150° C. In S210, the controller 300 increases the conveyance intervals between the conveyed sheets 913 in accordance with the image formation control signal "f" from the image formation control portion 303 so that the amount of heat that is drawn by the sheets 913 from the fixing device 911 in fixing is reduced. The amount of heat that is drawn by the sheets 913 may be reduced by lowering the conveyance speed of the sheets 913, for example.

In S211, the controller 300 determines, by the image formation control portion 303, whether or not the print has been completed. The controller 300 returns to the processing in S202 when determining that the print has not been completed, whereas the controller 300 proceeds to processing in S212 when determining that the print has been completed. In S212, the controller 300 stops the electric power supply from the fixing power supply device 250 to the fixing device 911 based on the signal "e" from the image formation control portion 303 so that the heating of the heater 912 of the fixing device 911 is stopped, and the image forming operation is consequently ended.

<Timing Chart (Part 1) of Power Supply Control>

FIG. 5A, FIG. 5B, FIG. 5C, FIG. 5D, FIG. 5E, FIG. 6A, FIG. 6B, FIG. 6C, FIG. 6D, and FIG. 6E are timing charts for showing how the fixing temperature of the fixing device 911, the electric power of the main power supply device 100, the electric power of the fixing power supply device 250, and the electric storage remaining amount of the electric storage device 200 change through the control by the power supply control portion in the process from the warm-up operation to the image forming operation, which are described with reference to FIG. 3 and FIG. 4. FIG. 5A to FIG. 5E are timing charts of a case in which the electric storage remaining amount of the electric storage device 200 does not fall below a predetermined value (reduction threshold). FIG. 6A to FIG. 6E are timing charts of a case in which the electric storage remaining amount of the electric storage device 200 falls below the reduction threshold in the image forming operation.

Figure 5A:
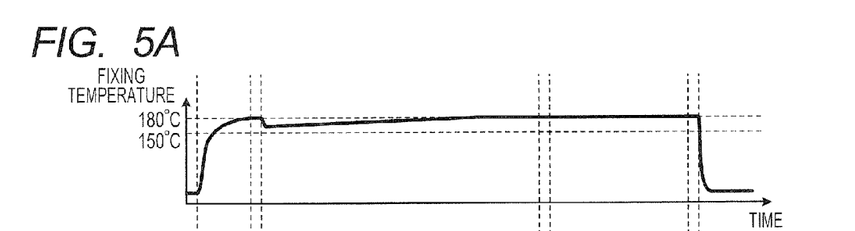
FIG. 5A, FIG. 5B, FIG. 5C, FIG. 5D, and FIG. 5E are timing charts of the image forming apparatus of the first embodiment.
Figure 5B:
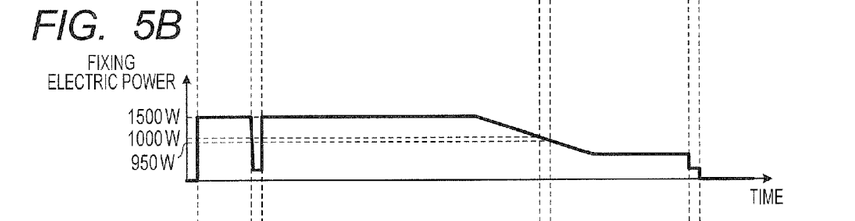
Figure 5C:
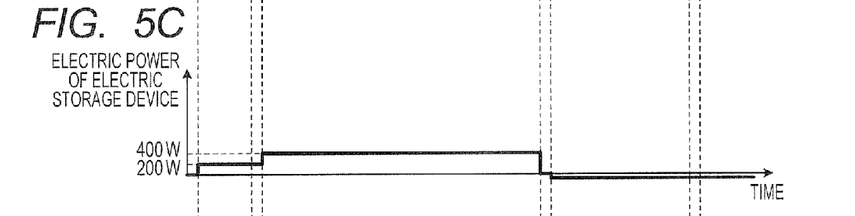
Figure 5D:
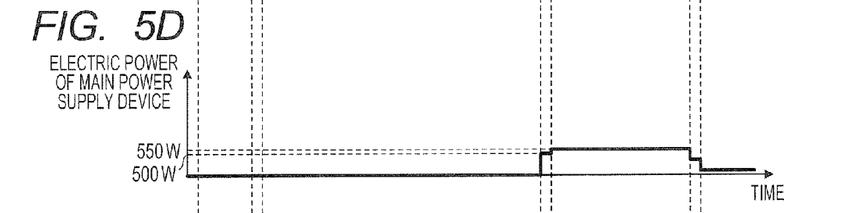
Figure 5E:
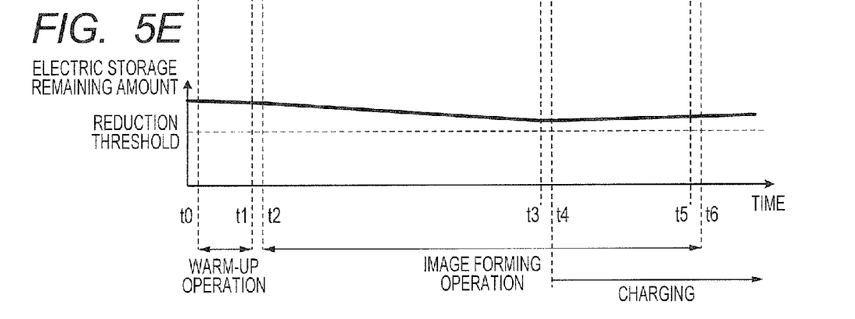

First, the case in which the electric storage remaining amount of the electric storage device 200 does not fall below the reduction threshold will be described with reference to the timing charts of FIG. 5A, FIG. 5B, FIG. 5C, FIG. 5D, and FIG. 5E. FIG. 5A is a graph for showing a change in fixing temperature of the fixing device 911, in which the vertical axis represents temperature. FIG. 5B is a graph for showing a change in electric power (fixing electric power) supplied from the commercial power supply 500 to the fixing power supply device 250, in which the vertical axis represents electric energy. FIG. 5C is a graph for showing a change in electric power (electric power of electric storage device) supplied from the electric storage device 200 to the load 400 and the controller 300, in which the vertical axis represents electric energy. FIG. 5D is a graph for showing a change in electric power supplied from the commercial power supply 500 to the main power supply device 100, in which the vertical axis represents electric energy. FIG. 5E is a graph for showing a change in voltage remaining amount (electric storage remaining amount) charged to the electric storage device 200, in which the vertical axis represents voltage. In FIG. 5A to FIG. 5E, the horizontal axis represents time, and t0 to t6 represent time points (timings). Further, in the first embodiment, the conversion efficiency (also referred to as "efficiency") of the main power supply device 100 between input electric power and output electric power is 80%.

At the timing t0, the electric storage remaining amount of the electric storage device 200 is in a voltage state that is higher than the reduction threshold, which is the threshold of the electric storage remaining amount. At the timing t0 where the warm-up operation is started, the third switch circuit 106 is switched to the contact 2 side (discharge side), and the second switch circuit 105 is switched to the contact 2 side (electric storage device side), in accordance with the result that an electric power of 200 W is supplied from the electric storage device 200 to the load 400 and the controller 300 (FIG. 5C). At this time, the relays 102 and 103 of the first switch circuit 104 are in an OFF (disconnection) state, and no AC voltage is thus supplied from the commercial power supply 500 to the main power supply device 100, which means that the main power supply device 100 stops operating (FIG. 5D). Further, with regard to the fixing power supply device 250, the heating of the heater 912 of the fixing device 911 is started with the fixing upper limit electric power of 1,500 W (FIG. 5B). Then, at the timing t1, the temperature of the fixing device 911 reaches the fixing set temperature of 180° C. and the warm-up operation is ended (FIG. 5A). The fixing electric power supplied from the commercial power supply 500 to the fixing power supply device 250 is thus reduced (FIG. 5B).

At the timing t2, the image forming operation is started to start the feeding of the sheet 913. When the image forming operation is started, necessary electric energy supplied from the electric storage device 200 to the load 400 and the controller 300 is increased from 200 W to 400 W at a maximum (FIG. 5C). The fixing temperature of the fixing device 911 is decreased once because the conveyed sheet 913 draws heat from the fixing device 911 (FIG. 5A). The fixing electric energy supplied from the commercial power supply 500 to the fixing power supply device 250 accordingly needs to be 1,500 W for a while (FIG. 5B). After that, when the fixing temperature is recovered to 180° C. (FIG. 5A), the necessary fixing electric energy is reduced, and at the timing t3, the fixing electric power supplied from the commercial power supply 500 to the fixing power supply device 250 falls below 1,000 W (FIG. 5B).

At the timing t3, the fixing electric power supplied from the commercial power supply 500 to the fixing power supply device 250 falls below 1,000 W (FIG. 5B). This means that the electric power supplied to the printer 900 does not exceed 1,500 W even when the maximum electric power of 400 W is supplied from the main power supply device 100 to the load 400 and the controller 300. As described above, the efficiency of the main power supply device 100 is 80%, and hence an electric power of 500 W needs to be supplied from the commercial power supply 500 in order to supply an electric power of 400 W from the main power supply device 100. As a result, the fixing electric power needs to be smaller than 1,000 W in order to keep the electric power supplied from the commercial power supply 500 equal to or lower than the maximum allowable power of 1,500 W. Thus, the relays 102 and 103 of the first switch circuit 104 are set to an ON (connection) state so that the AC voltage is input from the commercial power supply 500 to the main power supply device 100 to cause the main power supply device 100 to start operating (FIG. 5D). Then, the second switch circuit 105 is switched to the contact 1 side (main power supply device side) so that the electric power supply to the load 400 and the controller 300 is switched from the electric storage device 200 to the main power supply device 100.

Through this operation, an electric power of 500 W is supplied from the commercial power supply 500 to the main power supply device 100 (FIG. 5D), and the electric power output from the electric storage device 200 becomes 0 (FIG. 5C). From the timing t0 to the timing t3, the electric storage device 200 supplies the electric power to the load 400 and the controller 300, and the electric storage remaining amount of the electric storage device 200 is thus gradually reduced (FIG. 5E). Then, at the timing t4, the fixing electric power that is supplied from the fixing power supply device 250 to the fixing device 911 falls below 950 W. This means that the total electric power does not exceed 1,500 W even when an electric power of 50 W is added to charge the electric storage device 200 by the main power supply device 100. Thus, the third switch circuit 106 is switched to the contact 1 side (charging side) so that the charging of the electric storage device 200 is started (FIG. 5C). Through this operation, the electric power supplied from the commercial power supply 500 to the main power supply device 100 is increased from 500 W to 550 W (FIG. 5D).

Then, the print is ended at the timing t5, and at the timing t6, the electric power supply from the fixing power supply device 250 to the fixing device 911 is stopped, and the heating of the heater 912 is thus ended (FIG. 5B). In addition, the electric power supply from the main power supply device 100 to the load 400 is also stopped. However, the supply of electric power of 50 W from the commercial power supply 500 to the main power supply device 100 is continued to charge the electric storage device 200 (FIG. 5D).

<Timing Chart (Part 2) of Power Supply Control>

Next, the case in which the electric storage remaining amount of the electric storage device 200 falls below the reduction threshold in forming an image will be described with reference to the timing charts of FIG. 6A, FIG. 6B, FIG. 6C, FIG. 6D, and FIG. 6E. FIG. 6A to FIG. 6E are graphs similar to those of FIG. 5A to FIG. 5E, and hence the description of the graphs is omitted. In FIG. 6A to FIG. 6E, the horizontal axis represents time, and t0 to t2 and t7 to t11 represent time points (timings).

Figure 6A:
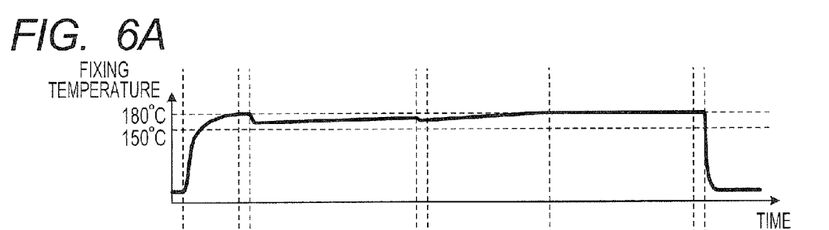
FIG. 6A, FIG. 6B, FIG. 6C, FIG. 6D, and FIG. 6E are timing charts of the image forming apparatus of the first embodiment.
Figure 6B:
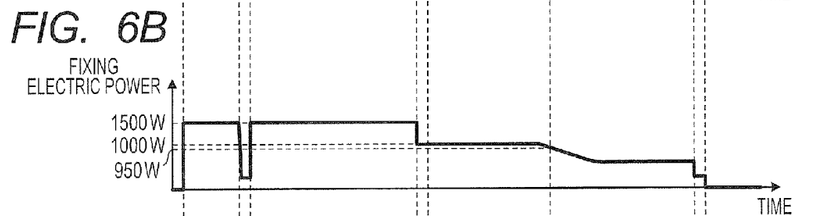
Figure 6C:
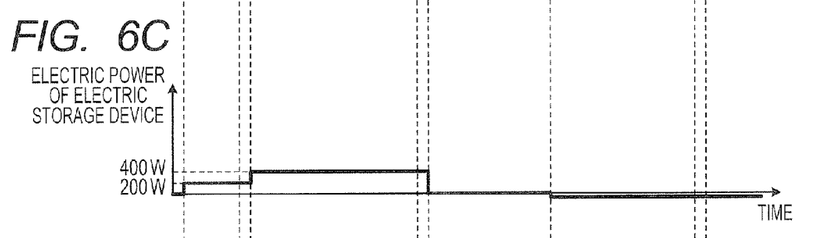
Figure 6D:
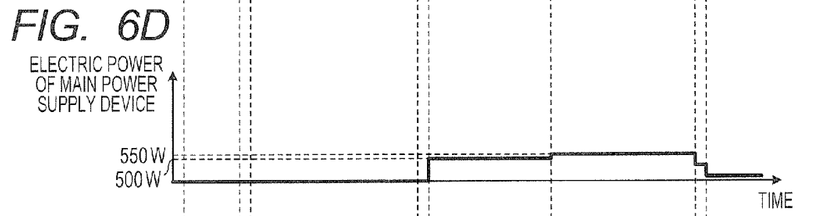
Figure 6E:
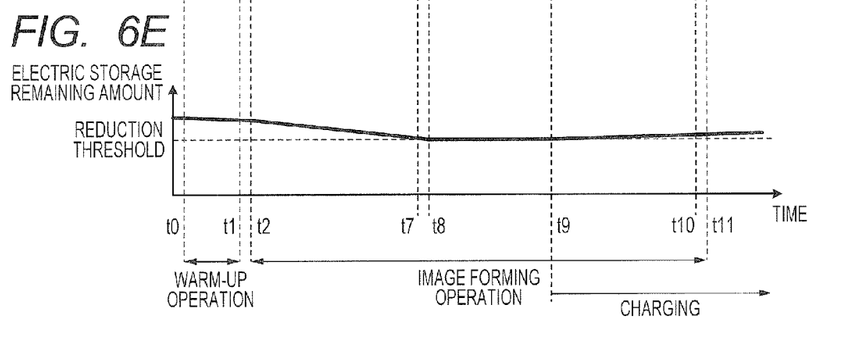

The timing charts are similar to those of FIG. 5A to FIG. 5E, which are described above, from the timing t0 to the timing t2, and the description thereof is herein omitted. When the electric storage device 200 is not sufficiently charged or the electric storage capacity of the electric storage device 200 is degraded over time, a period of time from when the electric power supply to the load 400 and the controller 300 is started to when the electric storage remaining amount of the electric storage device 200 falls below the reduction threshold is short. Thus, when the electric storage remaining amount of the electric storage device 200 falls below the reduction threshold at the timing t7 of FIG. 6A to FIG. 6E, the electric power supply to the load 400 and the controller 300 needs to be switched from the electric storage device 200 to the main power supply device 100. Thus, first, the fixing electric power, which is the amount of electric power supplied from the commercial power supply 500 to the fixing power supply device 250, is reduced from 1,500 W to 1,000 W (FIG. 6B). Then, when the fixing electric power is reduced to 1,000 W, the electric energy supplied to the printer 900 does not exceed 1,500 W even when the maximum electric power of 400 W is supplied from the main power supply device 100 to the load 400 and the controller 300. Thus, at the timing t8, the relays 102 and 103 of the first switch circuit 104 are set to an ON (connection) state so that the AC voltage is input from the commercial power supply 500 to the main power supply device 100 to cause the main power supply device 100 to start operating (FIG. 6D). Then, the second switch circuit 105 is switched to the contact 1 side (main power supply device side) so that the electric power supply to the load 400 and the controller 300 is switched from the electric storage device 200 to the main power supply device 100. Through this operation, an electric power of 500 W is supplied from the commercial power supply 500 to the main power supply device 100 (FIG. 6D), and the electric power output from the electric storage device 200 becomes 0 (FIG. 6C).

At the timing t9, the fixing electric power that is supplied from the commercial power supply 500 to the fixing power supply device 250 falls below 950 W. This means that the total electric power supplied to the printer 900 does not exceed 1,500 W even when an electric power of 50 W is added to charge the electric storage device 200 by the main power supply device 100. Thus, the third switch circuit 106 is switched to the contact 1 side (charging side) so that the electric power is supplied from the main power supply device 100 to the electric storage device 200 (FIG. 6D) and the charging of the electric storage device 200 is started (FIG. 6C). Through this operation, the electric power supplied from the commercial power supply 500 to the main power supply device 100 is increased from 500 W to 550 W (FIG. 6D).

Then, the print is ended at the timing t10, and at the timing t11, the electric power supply from the fixing power supply device 250 to the fixing device 911 is stopped, and the heating of the heater 912 is thus ended (FIG. 6B). In addition, the electric power supply from the main power supply device 100 to the load 400 is also stopped. However, the supply of electric power of 50 W from the commercial power supply 500 to the main power supply device 100 is continued to charge the electric storage device 200 (FIG. 6D).

As described above, in the first embodiment, in the warm-up operation and in a short period after the start of sheet feeding, the electric storage device 200 supplies the electric power to the load 400 and the controller 300 except for the fixing device 911, and the maximum allowable power of 1,500 W is used only for heating the fixing device 911. With this configuration, even when the heater temperature of the fixing device 911 is decreased in the image forming apparatus in the standby state, a period of time from the reception of an image formation request to the end of the warm-up operation can be shortened. In addition, even when the electric storage remaining amount of the electric storage device 200 is reduced during the image forming operation, the supply source that supplies electric power to the load 400 and the controller 300 is switched from the electric storage device 200 to the main power supply device 100 after the fixing electric power supplied from the commercial power supply 500 to the fixing power supply device 250 is reduced. With this configuration, the electric power supplied from the commercial power supply 500 to the printer 900 can be prevented from transiently exceeding the maximum allowable power of 1,500 W.

As described above, according to the first embodiment, the electric power supply to the load can be switched from the electric storage device to the main power supply device without exceeding the maximum allowable power.

Second Embodiment

In the first embodiment, before the electric power supply to the load 400 is switched from the electric storage device 200 to the main power supply device 100 due to a reduction in electric storage remaining amount of the electric storage device 200, the fixing electric power supplied from the commercial power supply 500 to the fixing power supply device 250 is reduced. At this time, the fixing electric energy to be reduced is the maximum electric energy necessary for the loads 400 and the controller 300 except for the fixing device 911. In a second embodiment, in switching the electric power supply to the loads 400 from the electric storage device 200 to the main power supply device 100, electric energy supplied to the load 400 and the controller 300 is detected, and the fixing electric power is reduced depending on the detected electric energy. The printer 900 being an image forming apparatus of the second embodiment is similar to that of the first embodiment, and hence the same reference symbols are used for the same devices to omit the description thereof.

<Control Block of Power Supply Control Portion>

Figure 7:
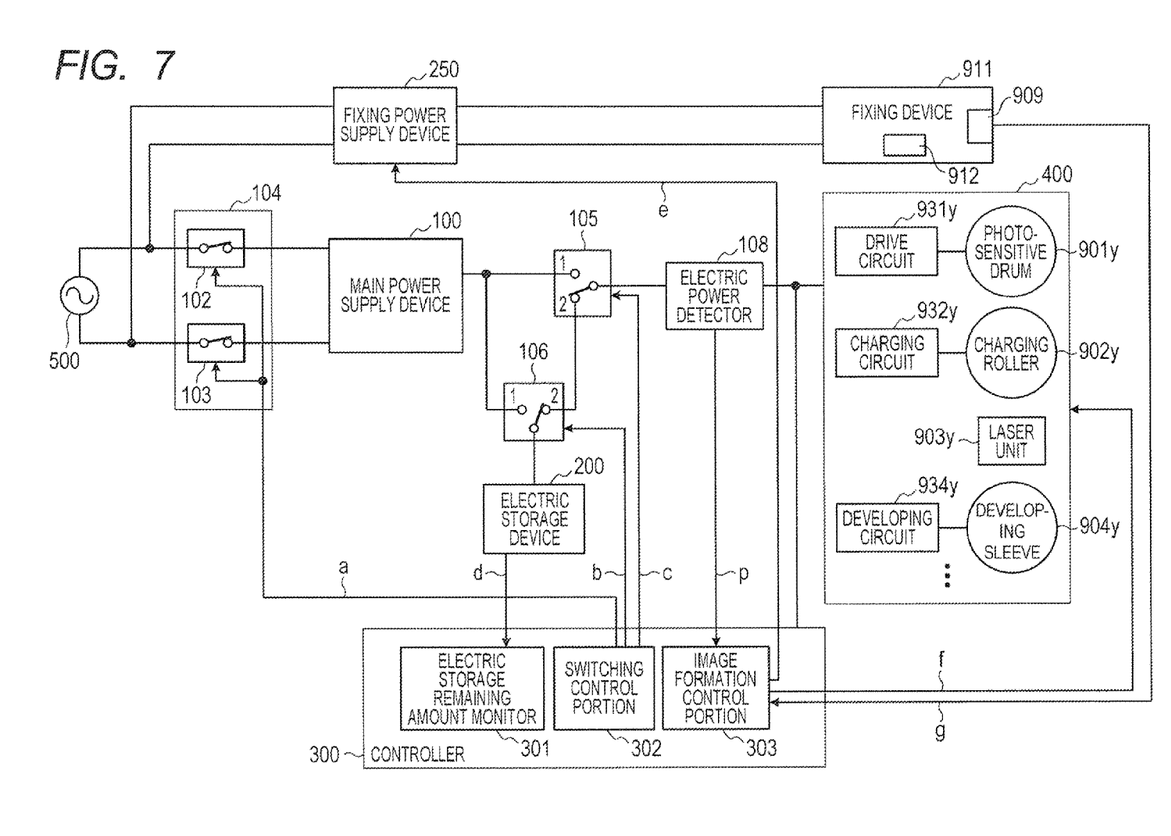
FIG. 7 is a control block diagram of a power supply system of the second embodiment.

FIG. 7 is a control block diagram of a power supply control portion of the second embodiment. FIG. 7 differs from the control block diagram of FIG. 2 for the first embodiment in that an electric power detector 108 is added. The electric power detector 108 is provided on power supply paths between the second switch circuit 105, and the load 400 and the controller 300, and is configured to detect electric energy supplied from the main power supply device 100 or the electric storage device 200 to the load 400 and the controller 300. The electric power detector 108 is configured to output a signal "p" indicating the detected electric energy to the image formation control portion 303. The image formation control portion 303 is configured to obtain, in accordance with the signal "p" from the electric power detector 108, electric energy P supplied to the load 400 and the controller 300. The devices illustrated in FIG. 7 except for the electric power detector 108 are similar to those of FIG. 2 for the first embodiment, and hence the same reference symbols are used for the same devices to omit the description thereof.

<Power Supply Control Sequence in Warming Up>

Figure 8:
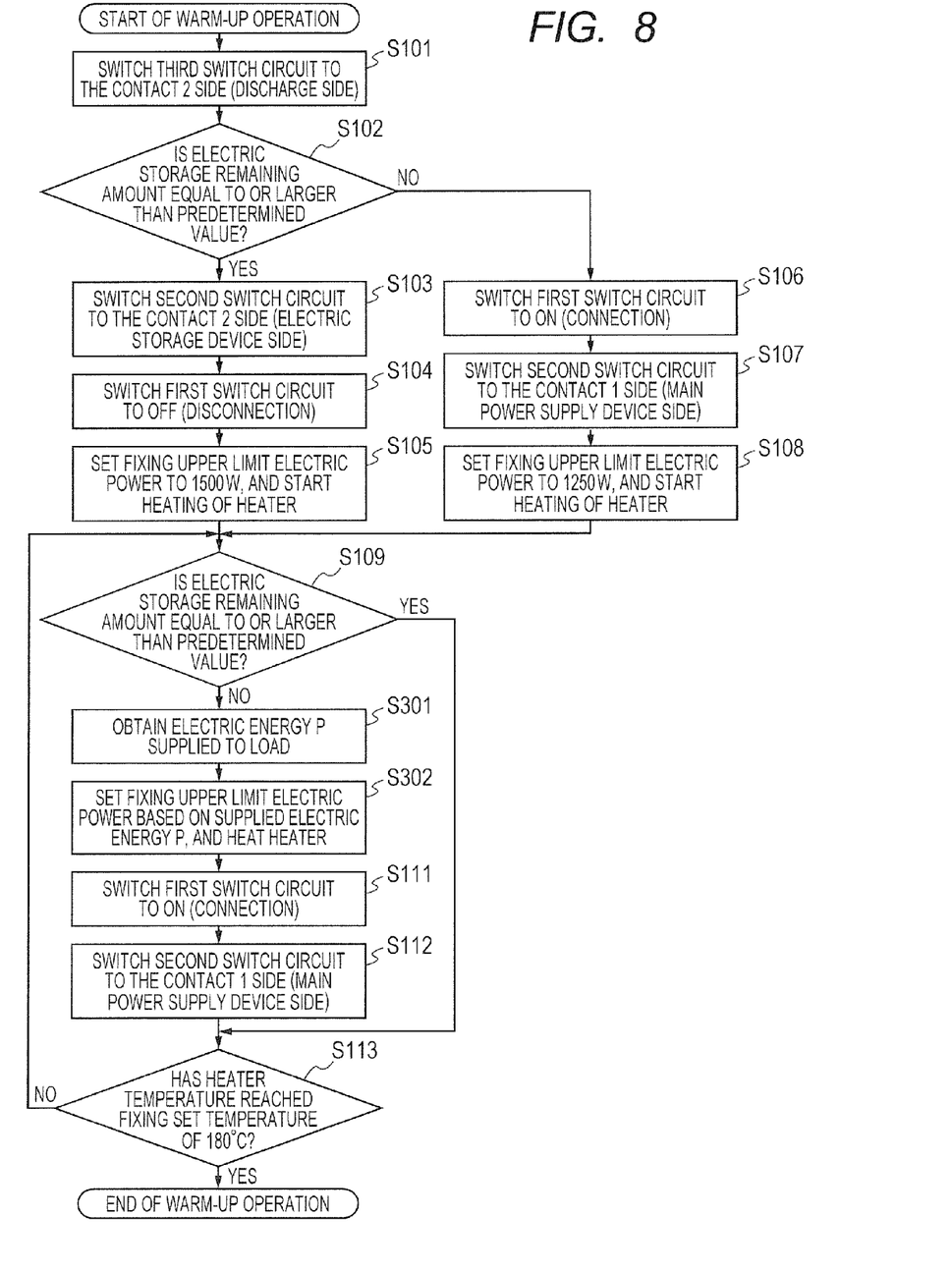
FIG. 8 is a flowchart for illustrating a control sequence of the image forming apparatus of the second embodiment.
Figure 9:
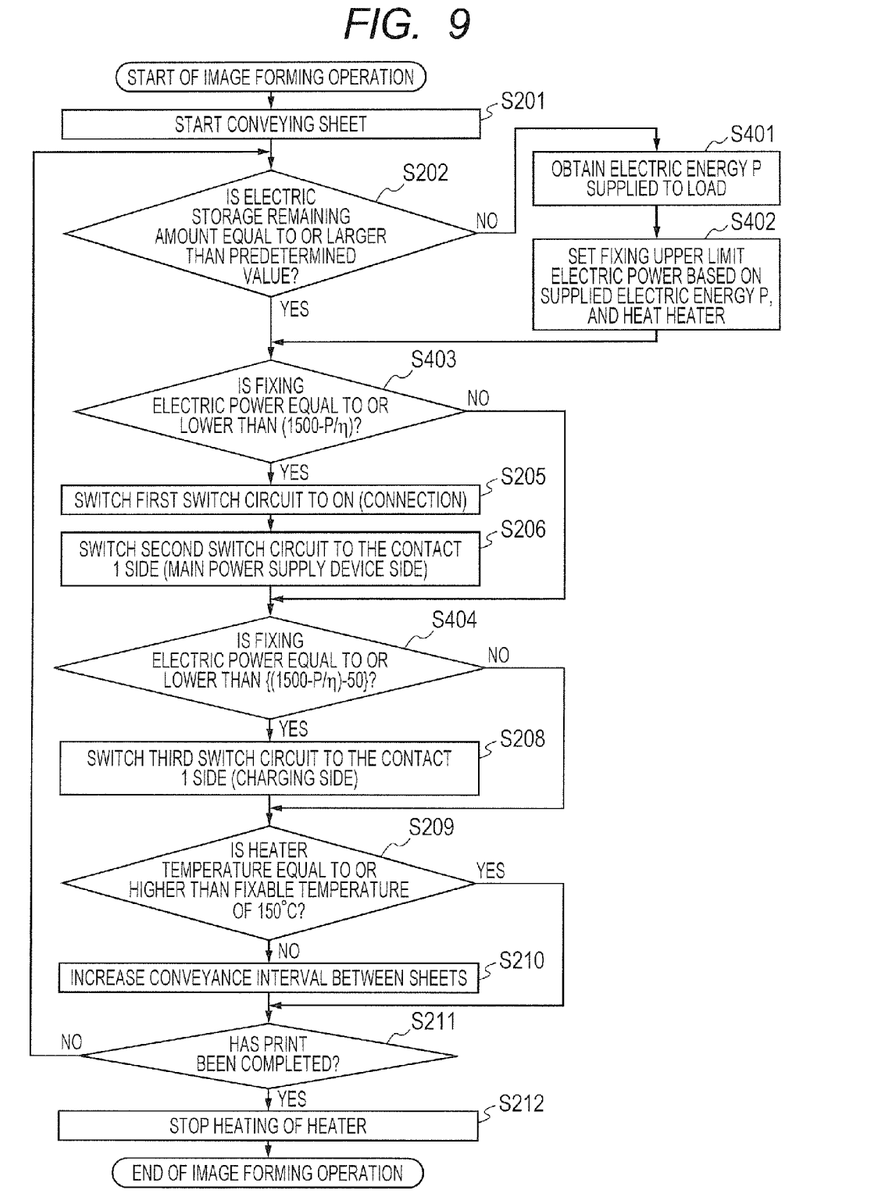
FIG. 9 is a flowchart for illustrating a control sequence of the image forming apparatus of the second embodiment.

FIG. 8 and FIG. 9 are flowcharts for illustrating control sequences related to electric power control for forming images through heating of the heater 912 of the fixing device 911 in the printer 900 of the second embodiment in the standby state. The controller 300 is configured to execute the flowcharts. Here, as in the first embodiment, a maximum allowable power that can be supplied from the commercial power supply 500 to the printer 900 is determined in advance based on the rated electric power, and is set to 1,500 W here, which is the rated electric power. Further, when the printer 900 is in the standby state, no electric power is supplied to the heater 912 of the fixing device 911. The printer 900 is configured to start warm-up operation for the fixing device 911 when receiving a print job being an image formation request, and then transition to the image forming operation when the heater 912 of the fixing device 911 reaches the predetermined temperature and the warm-up operation is thus completed. Further, an efficiency η being the conversion ratio of the main power supply device 100 between input electric power and output electric power, which will be described later, is measured in advance to be stored in the image formation control portion 303. In FIG. 8 and FIG. 9, the same processing as that of FIG. 3 and FIG. 4 for the first embodiment is denoted by the same step number, and the description of processing details thereof is omitted.

First, the warm-up operation of the printer 900 will be described with reference to the flowchart of FIG. 8. Processing in S101 to S108 of FIG. 8 is the same as the processing in S101 to S108 of FIG. 3 for the first embodiment, and the description thereof is herein omitted. In S109, the controller 300 determines whether or not the voltage remaining amount (electric storage remaining amount) of the electric storage device 200 is equal to or larger than the predetermined value based on a result from the monitor 301 monitoring the signal "d" from the electric storage device 200, which indicates the information on the charged voltage remaining amount. When the controller 300 determines that the electric storage remaining amount of the electric storage device 200 is equal to or larger than the predetermined value as a result of the monitoring by the monitor 301, the controller 300 proceeds to processing in S113. On the other hand, the controller 300 proceeds to processing in S301 when determining that the electric storage remaining amount of the electric storage device 200 is smaller than the predetermined value. In S301, the controller 300 receives, at the image formation control portion 303, the signal "p" output from the electric power detector 108, thereby obtaining the electric energy P supplied to the load 400 and the controller 300.

In S302, the controller 300 calculates, by the image formation control portion 303, the fixing upper limit electric power with the use of Expression (1).

$$\text{Fixing upper limit electric power (W)}=1{,}500\ (W)-P/\eta \quad (1)$$

In Expression (1), η represents the efficiency of the main power supply device 100. From Expression (1), the fixing upper limit electric power is calculated by subtracting electric power that is obtained by converting the electric energy P detected by the electric power detector 108 into the input electric power of the main power supply device 100 based on the efficiency η of the main power supply device 100 from the maximum allowable power of 1,500 W of the printer 900. Then, the controller 300 controls the electric energy supplied from the commercial power supply 500 to the fixing power supply device 250, depending on the fixing upper limit electric power that is calculated so that the electric power supplied from the commercial power supply 500 to the printer 900 does not exceed the maximum allowable power (1,500 W). In short, the controller 300 controls the electric energy supplied from the commercial power supply 500 to the fixing power supply device 250, based on the signal "e" from the image formation control portion 303. Through this operation, the fixing electric energy supplied from the commercial power supply 500 to the fixing power supply device 250 is lowered from 1,500 W to the fixing upper limit electric power calculated by Expression (1), and the electric power supplied to the fixing device 911 is lowered as well. Processing in S111 to S113 is the same as the processing in S101 to S108 of FIG. 3 for the first embodiment, and the description thereof is herein omitted.

<Power Supply Control Sequence in Image Forming Operation>

Next, the image forming operation, which is performed after the warm-up operation is ended, will be described with reference to the flowchart of FIG. 9. In S201, the controller 300 starts the image forming operation by the image formation control portion 303, and starts conveying the sheet 913 from the feed cassette 910. In S202, the controller 300 determines whether or not the voltage remaining amount (electric storage remaining amount) of the electric storage device 200 is equal to or larger than the predetermined value based on a result from the monitor 301 monitoring the signal "d" from the electric storage device 200, which indicates the voltage remaining amount information. When the controller 300 determines that the electric storage remaining amount of the electric storage device 200 is equal to or larger than the predetermined value as a result of the monitoring by the monitor 301, the controller 300 proceeds to processing in S403 while keeping the setting of electric power supply in the warm-up operation. On the other hand, the controller 300 proceeds to processing in S401 when determining that the electric storage remaining amount of the electric storage device 200 is smaller than the predetermined value. In S401, the controller 300 receives, at the image formation control portion 303, the signal "p" output from the electric power detector 108, thereby obtaining the electric energy P supplied to the load 400 and the controller 300. In S402, the controller 300 determines, by the image formation control portion 303, the fixing upper limit electric power with the use of Expression (1). Then, the controller 300 controls the electric power supplied from the commercial power supply 500 to the fixing power supply device 250, depending on the fixing upper limit electric power that is determined so that the electric power supplied from the commercial power supply 500 to the printer 900 does not exceed the maximum allowable power. In short, the controller 300 controls the electric energy supplied from the commercial power supply 500 to the fixing power supply device 250, based on the signal "e" from the image formation control portion 303. Through this operation, the fixing electric power supplied from the commercial power supply 500 to the fixing power supply device 250 is lowered from 1,500 W to the fixing upper limit electric power determined by Expression (1), and the electric energy supplied to the fixing device 911 is lowered as well.

In S403, the controller 300 determines whether or not the fixing electric power supplied from the commercial power supply 500 to the fixing power supply device 250 is equal to or lower than the fixing upper limit electric power expressed by Expression (1), through the processing in S402 or the determination that the fixing device 911 can be maintained at the fixing set temperature of 180° C. That is, the controller 300 determines whether or not the image formation control portion 303 sets the fixing electric power supplied to the fixing power supply device 250 to a value that is equal to or lower than the fixing upper limit electric power expressed by Expression (1). Here, the "fixing upper limit electric power expressed by Expression (1)" is a fixing upper limit electric power that is determined based on (1,500−P/η) in Expression (1). When the controller 300 determines that the fixing electric power supplied from the commercial power supply 500 to the fixing power supply device 250, which is set by the image formation control portion 303, is equal to or lower than the fixing upper limit electric power, the controller 300 proceeds to processing in S205. On the other hand, when the controller 300 determines that the fixing electric power supplied from the commercial power supply 500 to the fixing power supply device 250, which is set by the image formation control portion 303, is larger than the fixing upper limit electric power, the controller 300 proceeds to processing in S404. Processing in S205 and S206 is the same as the processing in S205 and S206 of FIG. 4 for the first embodiment, and the description thereof is herein omitted.

In S404, the controller 300 determines whether or not the fixing electric power supplied from the commercial power supply 500 to the fixing power supply device 250, which is set by the image formation control portion 303, is equal to or lower than an electric power of {(1,500−P/η)−50}, which is lower than the fixing upper limit electric power by 50 W. The determination is made with an electric power that is lower than the fixing upper limit electric power by 50 W because an electric power of 50 W needs to be supplied from the commercial power supply 500 to the main power supply device 100 in order to charge the electric storage device 200. When the controller 300 determines that the fixing electric power set by the image formation control portion 303 is equal to or lower than the electric power that is lower than the fixing upper limit electric power by 50 W, the controller 300 proceeds to processing in S208. On the other hand, when the controller 300 determines that the fixing electric power set by the image formation control portion 303 is larger than the electric power that is lower than the fixing upper limit electric power by 50 W, the controller 300 proceeds to processing in S209 and does not charge the electric storage device 200. Processing in S209 to S212 is the same as the processing in S209 to S212 of FIG. 4 for the first embodiment, and the description thereof is herein omitted.

As described above, also in the second embodiment, as in the first embodiment, the fixing electric power supplied from the commercial power supply 500 to the fixing power supply device 250 is reduced first, and then the electric power supply to the load 400 and the controller 300 is switched from the electric storage device 200 to the main power supply device 100. With this configuration, the electric power supplied from the commercial power supply 500 to the printer 900 can be prevented from transiently exceeding the maximum allowable power of 1,500 W. In particular, in the second embodiment, the electric energy supplied from the electric storage device 200 to the load 400 and the controller 300 is detected, and the fixing electric power is reduced by necessary electric energy depending on the detected electric energy and the efficiency of the main power supply device 100. With this configuration, the electric power that is supplied to the fixing device 911 can be reduced by a more optimal amount.

As described above, according to the second embodiment, the electric power supply to the load 400 can be switched from the electric storage device 200 to the main power supply device 100 without exceeding the maximum allowable power.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-173634, filed Sep. 6, 2016, which is hereby incorporated by reference herein in its entirety.

What is claimed is:

1. An image forming apparatus, comprising:
an image forming portion configured to form an image on a recording medium;
a fixing portion configured to heat the recording medium to fix the image onto the recording medium;
an electric storage portion configured to supply an electric power to a load configured to operate for image formation by the image forming portion;
a first power supply configured to supply an electric power supplied from an AC power supply to the load and the electric storage portion;
a second power supply configured to supply an electric power supplied from the AC power supply to the fixing portion; and
a controller configured to supply the electric power from the electric storage portion to the load and supply a predetermined maximum allowable power from the AC power supply to the second power supply when an image formation request for requesting image formation on the recording medium is input to the controller, wherein in a case where an electric storage remaining amount of the electric storage portion becomes lower than a predetermined value, the controller reduces the electric power supplied from the second power supply to the fixing portion lower than the maximum allowable power before the electric storage remaining amount of the electric storage portion becomes lower than the predetermined value, and thereafter switches an electric power supply to the load from the electric storage portion to the first power supply.

2. An image forming apparatus according to claim 1, wherein the controller controls the electric power supply to the load so as to prevent a total of the electric power supplied from the AC power supply to the first power supply and the electric power supplied from the AC power supply to the second power supply from exceeding the maximum allowable power.

3. An image forming apparatus according to claim 2, wherein in the case where the electric storage remaining amount of the electric storage portion becomes lower than the predetermined value, the controller sets, before the image forming portion forms the image on the recording medium, an upper limit of electric power that is able to be supplied from the AC power supply to the second power supply to an electric power obtained by subtracting a first electric power from the maximum allowable power, and the controller sets, when the image forming portion is forming the image on the recording medium, the upper limit of the electric power that is able to be supplied from the AC power supply to the second power supply to an electric power obtained by subtracting a second electric power that is larger than the first electric power from the maximum allowable power.

4. An image forming apparatus according to claim 3, wherein the first electric power and the second electric power comprise the electric power supplied from the AC power supply to the first power supply.

5. An image forming apparatus according to claim 4, wherein in a case where the electric power supplied from the AC power supply to the second power supply becomes equal to or lower than the electric power obtained by subtracting the second electric power from the maximum allowable power, the controller switches the electric power supply to the load from the electric storage portion to the first power supply.

6. An image forming apparatus according to claim 5, wherein in a case where the electric power supplied from the AC power supply to the second power supply becomes equal to or lower than an electric power obtained by subtracting the second electric power and a third electric power from the maximum allowable power, the controller causes the first power supply to supply an electric power to the electric storage portion to charge the electric storage portion.

7. An image forming apparatus according to claim 6, wherein the third electric power comprises an electric power supplied from the AC power supply to the first power supply to charge the electric storage portion.

8. An image forming apparatus according to claim 7, wherein the first electric power comprises an electric power that needs to be supplied to the load before the image forming portion forms the image on the recording medium, and the second electric power comprises an electric power that needs to be supplied to the load when the image forming portion is forming the image on the recording medium.

9. An image forming apparatus according to claim 7, further comprising an electric power detector configured to detect the electric power supplied to the load,
   wherein the controller determines the first electric power and the second electric power based on the electric power detected by the electric power detector and an efficiency of the first power supply.

10. An image forming apparatus according to claim 1, wherein the fixing portion comprises a heater configured to heat the recording medium, and a temperature detector configured to detect a temperature of the heater, and
    wherein the controller controls the electric power supplied from the second power supply to the fixing portion, depending on the temperature of the heater detected by the temperature detector.

11. An image forming apparatus according to claim 1, wherein the load comprises the image forming portion, a drive source configured to drive a part of the image forming portion, and the controller.

12. An image forming apparatus according to claim 1, further comprising a first switching portion configured to connect and disconnect a power supply path from the AC power supply to the first power supply,
    wherein in a case where the first power supply supplies the electric power to the load, the controller causes the first switching portion to connect the power supply path, and in a case where the first power supply does not supply the electric power to the load, the controller causes the first switching portion to disconnect the power supply path.

13. An image forming apparatus according to claim 1, further comprising a first switching portion, one end of which is connected to the load and the other end of which is connected the first power supply or the electric storage portion,
    wherein in a case where the electric power is supplied from the first power supply to the load, the controller connects the other end of the first switching portion to the first power supply, and in a case where the electric power is supplied from the electric storage portion to the load, the controller connects the other end of the first switching portion to the electric storage portion.

14. An image forming apparatus according to claim 13, further comprising a second switching portion, one end of which is connected to the electric storage portion, and the other end of which is connected to the load through the first power supply or the first switching portion,
    wherein in a case where the electric storage portion is charged, the controller connects the other end of the second switching portion to the first power supply, and in a case where the electric power is supplied from the electric storage portion to the load, the controller connects the other end of the second switching portion to the load through the first switching portion.

* * * * *